(12) United States Patent
Diaz et al.

(10) Patent No.: US 11,514,450 B2
(45) Date of Patent: Nov. 29, 2022

(54) SYSTEM AND METHOD FOR MOBILE PAYMENTS

(71) Applicant: Evertec Group, LLC, San Juan, PR (US)

(72) Inventors: Gustavo Diaz, San Juan, PR (US); Luis Muñoz, San Juan, PR (US); Duhamel Rosado, San Juan, PR (US)

(*) Notice: Subject to any disclaimer, the term of this patent is extended or adjusted under 35 U.S.C. 154(b) by 190 days.

(21) Appl. No.: 16/944,099

(22) Filed: Jul. 30, 2020

(65) Prior Publication Data

US 2022/0036353 A1 Feb. 3, 2022

(51) Int. Cl.
*G06Q 20/40* (2012.01)
*G06Q 30/02* (2012.01)
*G06Q 20/32* (2012.01)
*G06Q 20/34* (2012.01)
*G06Q 20/38* (2012.01)
*G06Q 20/10* (2012.01)
*G06Q 20/18* (2012.01)
*G06Q 20/20* (2012.01)
*G06Q 20/04* (2012.01)

(52) U.S. Cl.
CPC ........ *G06Q 20/401* (2013.01); *G06Q 20/047* (2020.05); *G06Q 20/102* (2013.01); *G06Q 20/18* (2013.01); *G06Q 20/206* (2013.01); *G06Q 20/209* (2013.01); *G06Q 20/3223* (2013.01)

(58) Field of Classification Search
CPC .............................................. G06Q 20/00–425
See application file for complete search history.

(56) References Cited

U.S. PATENT DOCUMENTS

| 6,847,953 | B2* | 1/2005 | Kuo | G06Q 20/401 |
| | | | | 705/64 |
| 9,928,493 | B2* | 3/2018 | Parker | G06Q 20/202 |
| 2014/0058862 | A1* | 2/2014 | Celkonas | G06Q 20/12 |
| | | | | 705/18 |
| 2015/0058145 | A1* | 2/2015 | Luciani | G06Q 20/3274 |
| | | | | 705/17 |
| 2020/0043033 | A1* | 2/2020 | Agrawal | G06Q 20/227 |

* cited by examiner

*Primary Examiner* — John W Hayes
*Assistant Examiner* — Chenyuh Kuo
(74) *Attorney, Agent, or Firm* — Eugenio J. Torres-Oyola; Victor M. Rodriguez-Reyes; Ferraiuoli LLC

(57) ABSTRACT

A system and method for making payments using an application installed on a mobile device, which has access to at least one source of funds. Said application interacts with a Point of Sale (POS) terminal through an application server. The user "checks-in" from the mobile application into said application server and the POS terminal sends a verification request to said application server, where the user confirms payment for a purchase. An Electronic Funds Transfer processing and switching system requests authorization from an issuer for completing said payment and provides confirmation of the transaction being authorized to the application server. The application server then notifies the mobile application and the POS terminal that the transaction has been completed in order to update the transaction records. A receipt of the transaction details may be printed or sent by email to the user.

19 Claims, 4 Drawing Sheets

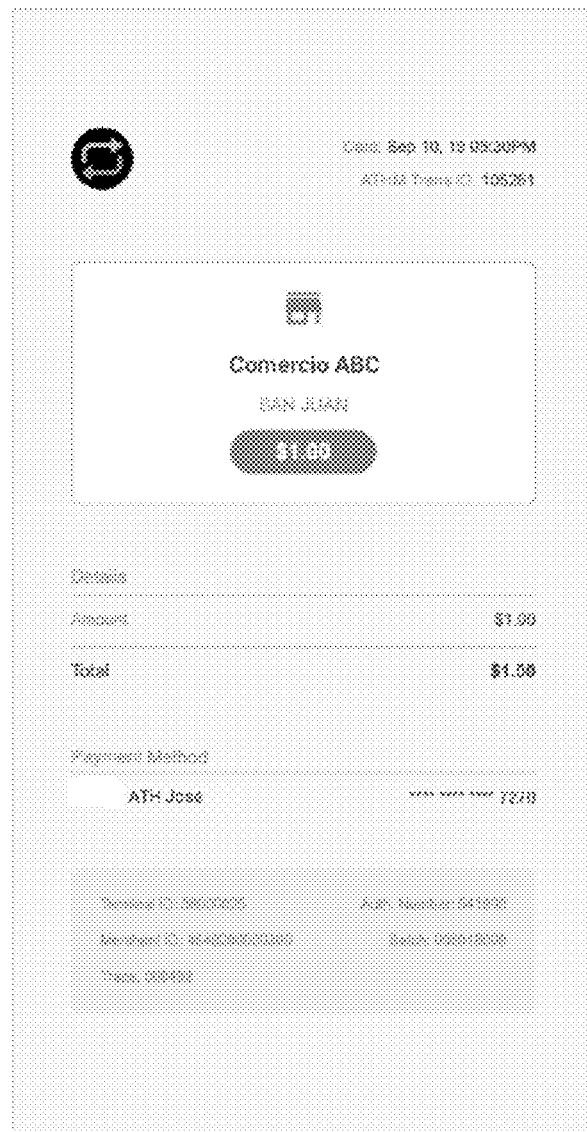
FIG. 4a
FIG. 4b

SYSTEM AND METHOD FOR MOBILE PAYMENTS

BACKGROUND

The following application is related to the field of payments using electronic mobile devices, such as smartphones. Specifically, the invention is directed at a system and method for securely making payments at physical businesses using a mobile device running an application which interacts with existing Point of Sale ("POS") terminals, without the need for any other physical payment instruments at the time of payment, such as cards or checks.

Almost every business has incorporated the use of electronic payment methods that allow customers to pay for their purchases in a more convenient and efficient manner. Even payments using non-electronic methods such as cash or checks are tied to electronic POS devices that update a business' data in order to maintain proper financial records. These POS devices are usually able to interact with credit/debit cards, and in more recent years, with Near Field Communication ("NFC") technology, allowing customers to not depend on having cash at all times.

Electronic payments technology has been further revolutionized by the use of mobile software applications running on mobiles devices such as smartphones. Using NFC technology, manufacturers have developed systems to incorporate an NFC chip into a smartphone in order to interact with a source of funds (such as a mobile wallet, bank account, gift card, or other) and use the device in a way similar to which a credit/debit card is used. These methods, however, require users to use a phone that include said NFC chip and therefore may not be easily adopted by some users and merchants.

Cash-less payment methods are extremely reliant on software security. A cash-less payment method needs to ensure its user that the information stored in the device, the system through which said information is transmitted, and the system that receives it are all compliant with the relevant security standards. Therefore, security protocols and safeguards must be implemented in combination with these types of applications in order to ensure that transactions take place in a secure manner, and trustworthiness is enough to warrant user adoption.

Payment instruments, such as debit/credit cards, have been recently upgraded to include NFC chips that allow for contactless payments at POS terminals. The use of NFC instead of the traditional magnetic strip results in more secure transactions, and less physical contact of the user with the POS terminal. However, cards are very easily damaged and lost, and every source of funds requires a separate card. This results in users having to carry as many cards as they have sources of funds.

In other scenario, a user may need an NFC-enabled smartphone to be able to use a mobile payment method at a store. An application downloaded to the mobile device may require the user to login in order to access his or her sources of funds. Said application can access the NFC chip physically present in the device in order to access said source of funds and interact with a POS terminal to complete the transaction. Using the NFC-enabled device, the user can place it in the proximity of the POS terminal and the POS terminal can access the user's source of funds for debiting the required funds. This process, however, requires that the POS terminal includes NFC hardware and is compatible with the payment application installed on the user's phone. Merchants are required to upgrade all their terminals in order to provide this payment method for their customers. Further, both the customer and the merchant must know if the phone has the correct hardware to use this type of service and if it is correctly configured to allow the mobile payment. This method also requires that every customer place their phone in the proximity of the POS terminal, which could potentially result in a health hazard as phones tend to carry a great number of germs.

Other existing electronic payment methods that may not present similar health and convenience concerns, may create other issues. For example, some mobile payment solutions provide the functionality for scanning a matrix code to obtain merchant information, or entering the merchant information manually, allowing the user to manually enter the purchase amount and showing the phone to the merchant as evidence of payment when the transaction is complete. This solution, however, may require that the customer calculates any additional charges, such as tax, on the spot, and may not correlate the payment to a specific transaction processed through the POS terminal, which results in unclear records.

Therefore, there is a need for a platform that allows efficient, safe, and reliable mobile payments that do not require merchants to upgrade their hardware, eliminates the need for customers to have physical contact with POS terminals and provides accurate transactions records.

DESCRIPTION OF THE PRIOR ART

Many solutions have been proposed for using POS terminals interacting with mobile devices in order to avoid the need for users to carry cards or cash. However, none of the existing solutions allow for using existing POS terminals to connect with an application server that processes the user's source of funds information without requiring the merchant to use a physical payment instrument in order to process transactions. For example, U.S. Patent Application No. 2014/0,244,506 discloses a system for payment processing that requests authorization information from a user, with the authorization information confirming that the user intends to complete a payment transaction at a POS terminal. After authorization information is received, transaction information is received, with the transaction information being indicative of the payment transaction being initiated at the payment terminal. The authorization information is compared with transaction information, and based on the result of the comparison, the payment transaction is either allowed or disallowed. Application 2014/0,244,506 requires that the person operating the POS uses a payment instrument, such as a card, in order to generate the transaction information to be compared to the authorization information. Therefore, the invention disclosed by Application 2014/0,244,506 does not avoid the need for cards with information stored inside and does not solve issues like cards being damaged and the health risks presented by having many merchant operators having physical contact with the cards.

U.S. Patent Application No. 2015/0,058,145 discloses a process for mobile payment platforms to be enabled in existing POS terminals without the necessity of implementing new hardware or software at the merchant level. This is achieved by having the operator of the POS terminal swipe a physical payment instrument containing the merchant's information in order to generate an authorization request for the user to complete the transaction using a mobile device. This application also requires the use of a physical instrument at the POS terminal, and does not solve any of the aforementioned issues.

U.S. Patent Application No. 2017/0,262,828 discloses a payment processing method comprising receiving, through a payment application running on a mobile device of a customer, QR code data, a client transaction settlement request, and a processor transaction settlement request. The method further comprises verifying said requests, and transforming it into a combined transaction settlement request comprising the Merchant ID, the transaction amount, and customer financial instrument information, and transmitting the combined transaction settlement request to a processor payment gateway, receiving a transaction result, and transmitting the transaction result. This application, however, requires that the information provided by the QR code comprises several elements, such as a merchant ID, a POS terminal ID and merchant processor information, which is too much data to enter manually and requires that the user device always includes an optical scanning device, such as a camera or scanner. Further, the invention disclosed by this application also requires the use of a physical card to be swiped in the POS terminal by the merchant operator in order to create the processor transaction settlement request.

BRIEF SUMMARY

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

When the word "invention" is used in this specification, the word "invention" includes "inventions", that is, the plural of "invention". By stating "invention", the Applicant does not in any way admit that the present application does not include more the one patentable and non-obviously distinct invention and Applicant maintains that the present application may include more than one patentably and non-obviously distinct invention. The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The present application discloses a method and system to enable payments at a POS terminal using only a mobile device running a payment application. The present invention provides a solution for the current problems caused by the reliance on physical payment instruments, such as cards, to be able to complete transactions in an efficient and safe manner by processing the purchase information from the POS through an application server that also processes the user's payment information and acquires proper authorization from issuers. Further, the present invention provides several confirmations throughout the payment process, resulting in reliable records.

In some embodiments, the present invention comprises an application server that receives a user "check-in" request from a mobile device and a verification request from a POS terminal. The application server confirms to the POS terminal that the user has checked in. The POS terminal then sends another verification request to the application server to verify if the user has confirmed the transaction. After the user confirms the transaction, the application server sends a payment authorization request to an Electronic Funds Transfer processing and switching system ("EFT System"). The EFT System then sends a further authorization request to the user's issuing bank. Said authorization is responded by the bank to the EFT System and is then sent back to the application server in order to update transaction records and confirm to both the merchant and the user that the transaction was successfully completed.

In some embodiments, the present invention allows the mobile device to send the "check-in" request to the application server by scanning a matrix code using the mobile device's camera or scanner. In other embodiments, the "check-in" request may be done by entering the POS terminal information manually.

In some embodiments, the present invention provides the user the option of selecting one from several sources of funds in the mobile application when reviewing the transaction information after checking in to the application server. In other embodiments, the user may also modify the payment amount to include a tip. Said tip may also be automatically added by the POS and not modifiable by the user.

In some embodiments, the present invention allows for the POS to print a receipt in order to have physical evidence of the transaction's completion. In other embodiments, the receipt may be delivered to the user by email or other methods. In further embodiments, the present invention provides the user with evidence of each completed transaction on the device.

Other embodiments of the present invention may interface with the merchant's management system, allowing transactions made using the present invention to be documented in the same way as any other transaction.

BRIEF DESCRIPTION OF THE DRAWINGS

FIGS. 4*a* and 4*b* show a physical and digital version of a transaction receipt provided by an exemplary embodiment of the present invention.

DETAILED DESCRIPTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting.

Figure 1:
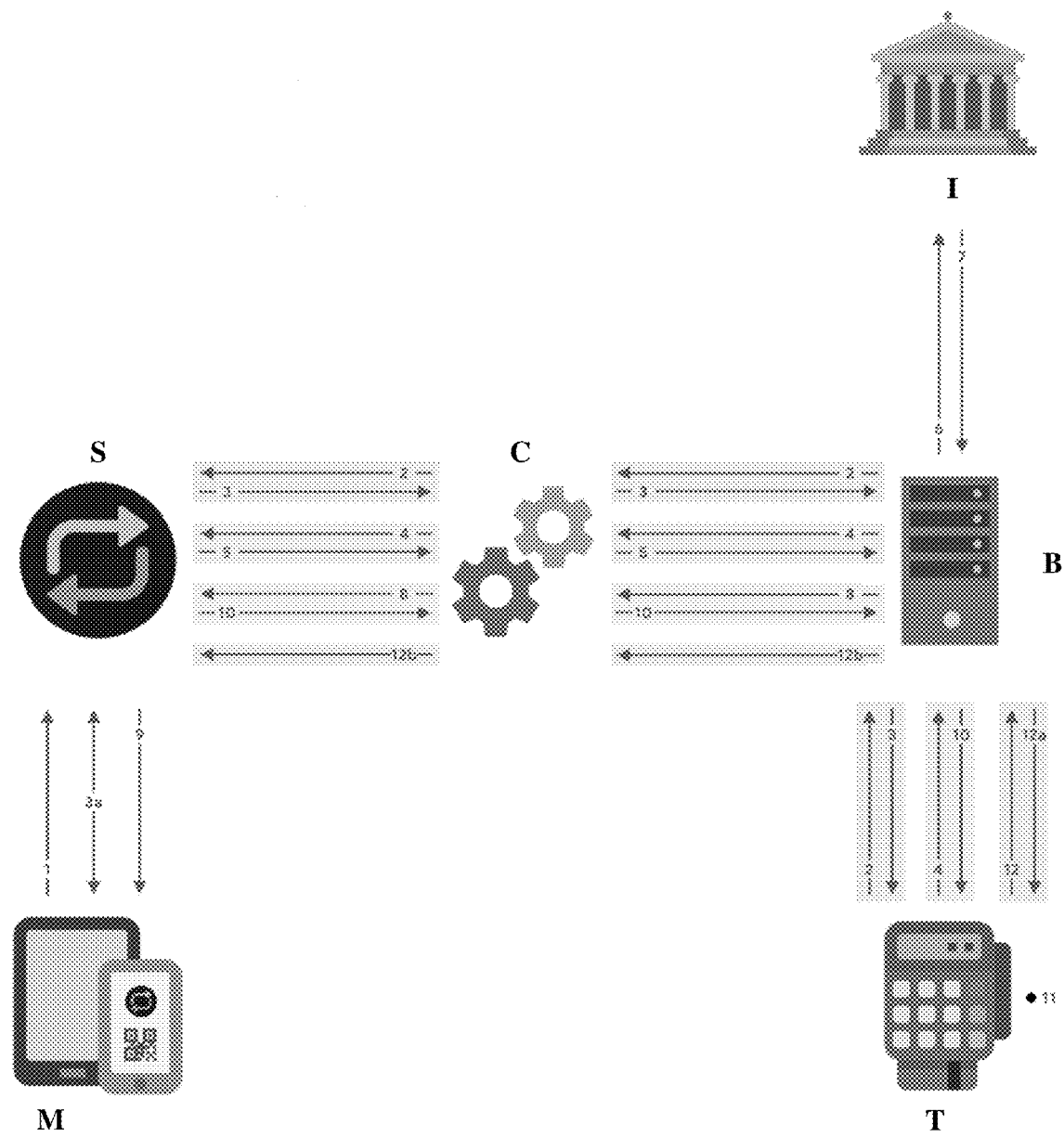
FIG. 1 shows a diagram on the components of the present invention and the steps required to complete a transaction according to the teaching of the present invention.

As shown in FIG. 1, the present invention comprises a mobile application M running on a mobile device, an application service S, a software communication gateway C, an EFT system B, an issuing bank I and a POS terminal T.

Figure 2A:
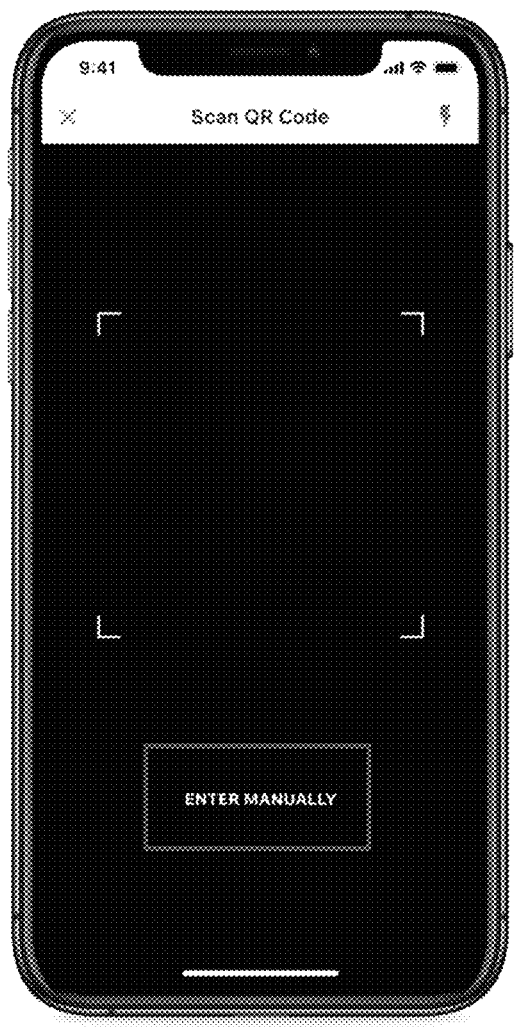
FIGS. 2a and 2b show an exemplary embodiment of the mobile application that is part of the present invention allowing the user to scan a matrix code or manually entering the code information.
Figure 2B:
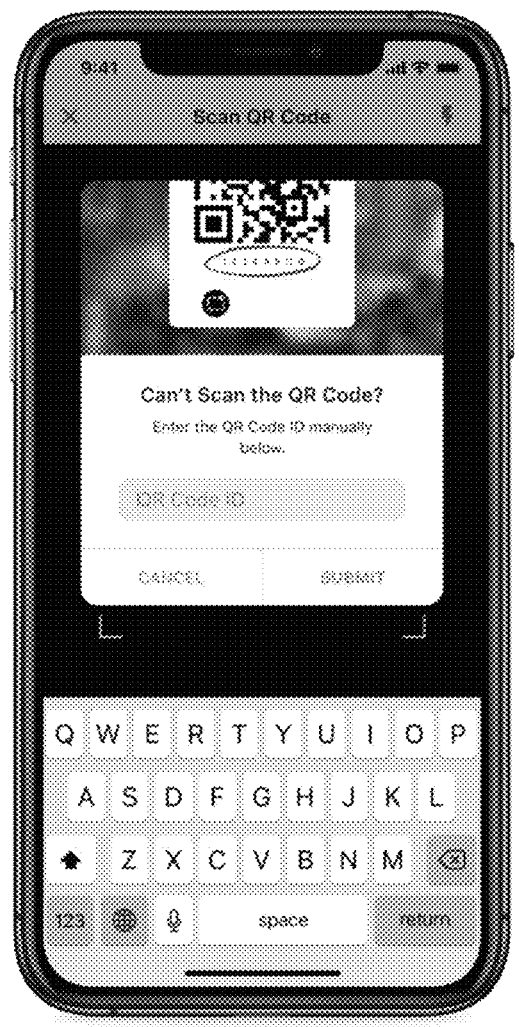

In exemplary embodiments of the present invention, mobile application M may be a software application that runs natively on popular mobile operating systems such as iOS and Android, or it may be a mobile web application executed from a mobile web browser. Mobile application M provides secure access to a user's sources of funds. The user may log in to the application with a username and password combination, biometric information such as fingerprint data, telephone number linked to the user account, among others. When the user logs in, the application provides the functionality of scanning matrix codes using the mobile device's camera or scanner (FIG. 2*a*). For mobile devices that do not feature a camera or scanner, the application may provide the functionality to manually enter the information that stored in the matrix code (FIG. 2*b*). Any matrix code, such as QR (static or dynamic), barcode, etc., may be used with the present invention, as the information to be stored in the code is a string of alphanumerical characters. Such information may include identification of the POS terminal T and/or additional information related to the transaction (such as transaction ID, merchant information, and others). The matrix codes may be provided to customers in a variety of ways (e.g. posters, stickers, or cards) to be placed in the proximity of, or within the POS terminal T to which they belong, so users can easily know which code to scan when making a payment. As previously mentioned, the matrix code's information may also be printed to be placed in the proximity of the POS terminal T in order to allow users with devices that cannot scan the code to enter it manually into the application M. Further embodiments of the present invention may include presenting the code to the customer on the POS terminal's screen, allowing for the code to be generated on the spot instead of being tied to the codes that have already been printed. The code may also be a dynamic code, which contents may be modified to include further information, such as merchant identification, location information, special promotions, and any other information that may be relevant to the transaction. In other embodiments of the present invention, the POS terminal may be operated by the user himself or herself. For example, a self-checkout system (at a store or restaurant) may allow the user to select an option to use the present invention as a payment method and show a code to be scanned.

The present invention further comprises application service S. Application service S may run in virtual, physical or cloud servers. Application service S provides the interoperability between mobile application M and POS terminal T. When a user scans a code or enters code data manually using mobile application M (step 1), application service S receives a "check-in" request from the user and waits for the POS terminal T to send a "check-in" verification message (step 2). Said "check-in" verification message is transmitted to application service S through EFT System B and gateway C using an ID, such as a virtual Bank Identification Number ("BIN"), that routes the transaction and allows application service S to confirm if the user is checked in or not (step 3). This "check-in" verification message is sent multiple times until a response is received or until a maximum amount of allowed retries is reached. Gateway C may consist of a software bus that allows communication between software modules. In the case of the present invention, gateway C allows for all communication between application service S and EFT system B. EFT system B may be any commercially available EFT processing and switching software that provides secure transaction authorization, such as ACI Worldwide, Inc.'s BASE24.

Figure 3A:
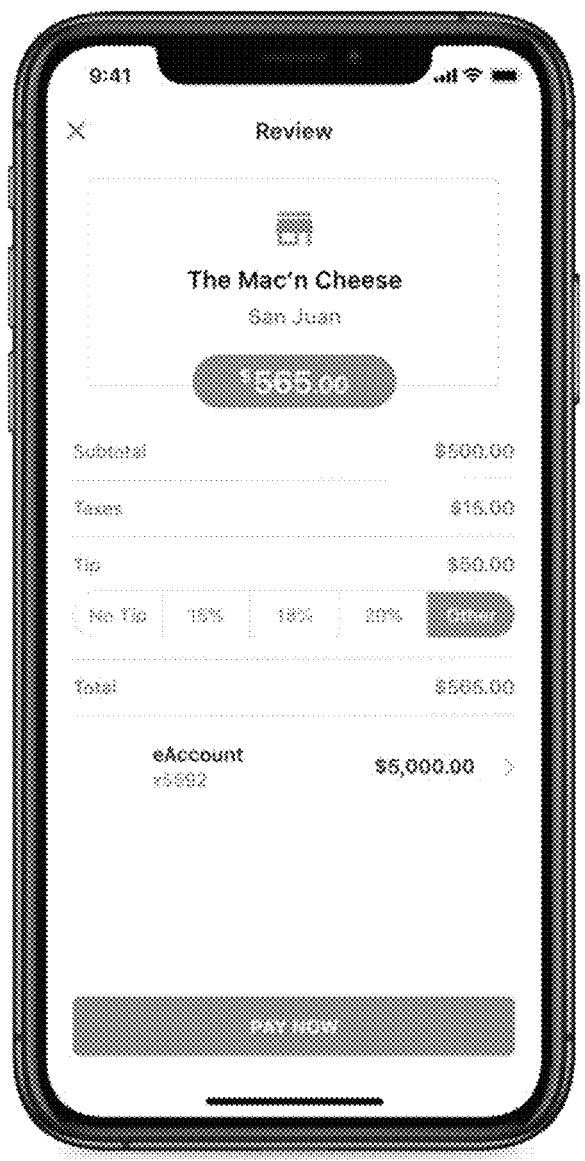
FIGS. 3a and 3b show an exemplary embodiment of the mobile application that is part of the present invention allowing the user to modify the payment amount and select the source from which to withdraw the funds.
Figure 3B:
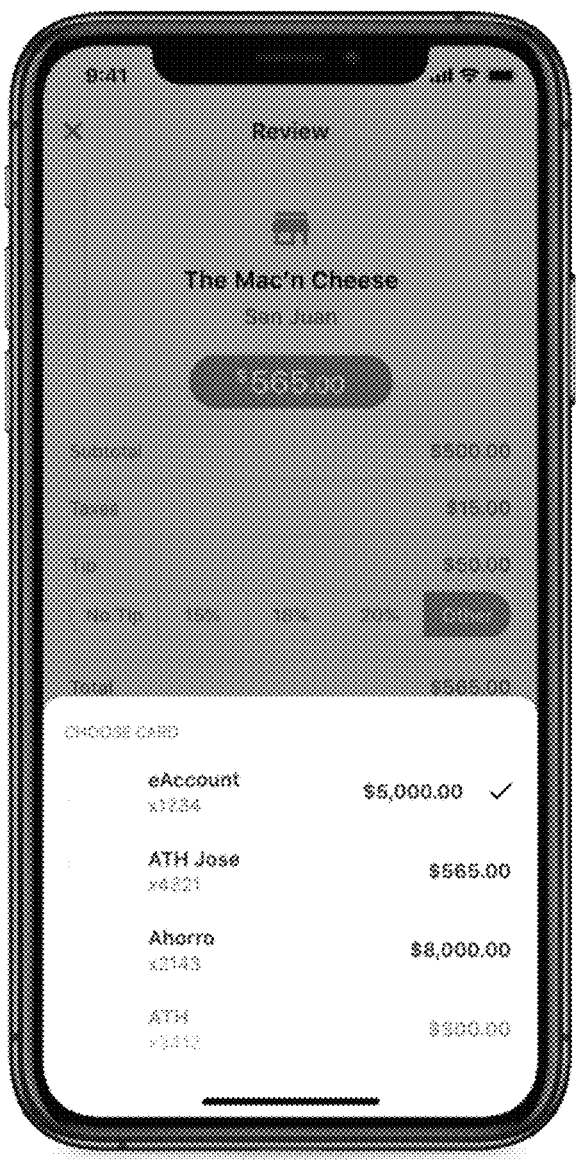

After confirmation, the user is presented with the transaction information and purchase amount to confirm payment (step 3*a*). In further embodiments of the present invention, mobile application M may provide the user with the option to add a tip to the purchase amount (FIG. 3*a*). In other embodiments, the user may be given the option to select one from a plurality of linked sources of funds to pay the purchase amount (FIG. 3*b*). In further embodiments, additional automatic charges related to the transaction may be added by POS terminal T based on the nature of the transaction. These charges may include, for example, mandatory tips added to purchases higher than a specific amount, or special taxes related to a specific services or products.

When the user confirms the final purchase amount and the source from which the funds should be withdrawn (step 3*a*), mobile application M sends the payment confirmation to application service S. After receiving confirmation from application service S that user is checked in (step 3), POS terminal T sends another confirmation request for the payment authorization to the application service S (step 4). This confirmation request from the POS terminal is sent multiple times until a response is received or until a maximum amount of allowed retries is reached. Application service S receives said payment confirmation request and, if the user has confirmed the payment, sends an authorization request to the EFT system B that authorization from the issuing bank I is required (step 5). EFT system B then requests authorization from the issuing bank I (step 6). After the issuing bank I responds the requested authorization (step 7), EFT system B confirms to application service S if the transaction has been authorized or not (step 8). The application service S then sends the authorization response to the mobile application (step 9) to notify the user of the result of the payment and sends to the POS terminal T the authorization response for the merchant's records to be updated and for the POS terminal to print the merchants voucher (step 10).

Further embodiments of the present invention allow mobile application M to provide a transaction history to the user. Application service S may provide updates to mobile application M regarding completed transactions in order for said transaction history to provide up to date information at all times (step 9). Application service S may also provide transaction completion confirmation to POS terminal T for the merchant's records to be updated as well (step 10).

Further embodiments of the present invention provide the functionality of generating and printing receipts (step 11). These receipts may be printed by the POS terminal T (FIG. 4*a*) or may be sent to the customer by email (FIG. 4*b*).

POS terminal T then notifies EFT system B that the transaction has been received successfully by the POS terminal (step 12). Finally, EFT system B acknowledges receipt of the transaction complete confirmation (step 12*a*) and provides a notification to application service S that POS terminal T has successfully received the transaction (step 12*b*).

Further embodiments of the present invention may interact with the merchant's management system. Transaction information may be sent to said management system in the same way it is sent to mobile application M in step 9, such that said management system may keep up to date information that includes transaction processed using the method disclosed in the present application, just like with any other payment method. Said transaction information may be used by said management system for audit purposes, security or generating reports.

While the disclosure includes reference to specific embodiments, it will be understood by those skilled in the art that various changes may be made and equivalents may be substituted for elements thereof without departing from the true spirit and scope of the disclosure. In addition, many modifications may be made without departing from the essential teachings of the disclosure. When reference is made to specific known applications or systems, it will be understood by those skilled in the art that various substitutes and alternatives may be available.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

The invention claimed is:

1. A method for mobile payment, wherein the method does not require providing a user's source of funds information to a point of sale terminal, comprising the steps of:
   receiving, by an application service, a check-in request from a mobile software application running on a mobile device of a user, wherein the check-in request comprises a point of sale terminal identifier number related to a point of sale terminal;
   wherein the mobile software application provides access to a user's source of funds information of the user;
   receiving, by the application service, a check-in verification request from the point of sale terminal through an Electronic Funds Transfer processing and switching system and a software communication gateway;
   wherein the check-in verification request contains a virtual Bank Identification Number and the point of sale terminal identification number;
   determining, by the application service, that the user is checked in by verifying that the point of sale terminal identification number received from the mobile software application in the check-in request and the point of sale terminal identification number received from the point of sale terminal in the check-in verification request match;
   based on the determination, sending, by the application service, a confirmation of the check-in verification request to the point of sale terminal through the Electronic Funds Transfer processing and switching system and the software communication gateway;
   in response to the confirmation of the check-in verification request, receiving, by the application service, a payment authorization request from the point of sale terminal through the Electronic Funds Transfer processing and switching system and the software communication gateway;
   sending, by the application service, the payment authorization request to the mobile software application;
   in response to sending the payment authorization request to the mobile software application, receiving, by the application service, a payment authorization from the mobile software application;
   wherein the payment authorization includes the user's source of funds information;
   sending, by the application service, the payment authorization to the user's source of funds through the Electronic Funds Transfer processing and switching system and the software communication gateway;
   in response to sending the payment authorization to the user's source of funds, receiving, by the application service, a payment confirmation from the user's source of funds through the Electronic Funds Transfer processing and switching system and the software communication gateway;
   sending, by the application service, the payment confirmation to the mobile software application;
   sending, by the application service, the payment confirmation to the point of sale terminal through the Electronic Funds Transfer processing and switching system and the software communication gateway; and
   receiving, by the application service, an acknowledgement receipt of the payment confirmation from the point of sale terminal through the Electronic Funds Transfer processing and switching system and the software communication gateway.

2. The method of claim 1, wherein receiving the check-in request from the mobile software application further comprises:
   scanning, by the mobile software application, a matrix code associated with the point of sale terminal, wherein the scanned matrix code comprises the point of sale identification number of the point of sale terminal.

3. The method of claim 1, wherein the received point of sale terminal identification number is manually entered by the user via the mobile software application.

4. The method of claim 1, wherein the received check-in verification request from the point of sale terminal comprises displaying, by the point of sale terminal, a manual section option for check-in for the user.

5. The method of claim 1, before the sending of the payment authorization to the user's source of funds, the method further comprising:
confirming, by the mobile software application, a final purchase amount; and
adding a tip, by the mobile software application;
wherein the received payment authorization from the mobile software application comprises the final purchase amount and the added tip.

6. The method of claim 1, further comprising:
receiving, by the point of sale terminal, the payment confirmation;
in response to the received payment confirmation, printing, by the point of sale terminal, a transaction receipt.

7. The method of claim 6, further comprising:
sending, by the point of sale terminal, the transaction receipt through email to the user through the application service.

8. The method of claim 5, further comprising:
adding, by the application service, one or more additional charges to the final purchase amount, wherein the payment authorization verification request sent to the user's source of funds further comprises the one or more additional charges.

9. The method of claim 1, further comprising:
sending, by the application service, the acknowledgement receipt of the payment confirmation from the point of sale terminal to a merchant management system.

10. The method of claim 1, wherein the point of sale terminal is integrated to a self-checkout system.

11. A system for mobile payment, wherein said method does not require providing a user's source of funds information to a point of sale terminal, comprising:
a point of sale terminal;
a software communication gateway;
an electronic funds transfer software module related to an Electronic Funds Transfer processing and switching system;
a mobile software application running on a mobile device;
an application service, comprising a computer processor and a non-transitory computer-readable storage medium, the non-transitory computer-readable storage medium storing instructions that when executed by the computer processor cause the computer processor to execute the steps of:
receiving, a check-in request from the mobile software application, wherein the check-in request comprises a point of sale terminal identifier number related to a point of sale terminal;
wherein the mobile software application provides access to a user's source of funds information of the user;
receiving a check-in verification request from the point of sale terminal through the Electronic Funds Transfer processing and switching system and the software communication gateway;
wherein the check-in verification request contains a virtual Bank Identification Number and the point of sale terminal identification number;
determining that the user is checked in by verifying that the point of sale terminal identification number received from the mobile software application in the check-in request and the point of sale terminal identification number received from the point of sale terminal in the check-in verification request match;
based on the determination, sending a confirmation of the check-in request to the point of sale terminal through the Electronic Funds Transfer processing and switching system and the software communication gateway;
in response to the confirmation of the check-in request, receiving a payment authorization request from the point of sale terminal through the Electronic Funds Transfer processing and switching system and the software communication gateway;
sending the payment authorization request to the mobile software application;
in response to sending the payment authorization request to the mobile software application, receiving a payment authorization from the mobile software application;
wherein the payment authorization includes the user's source of funds information;
sending the payment authorization to the user's source of funds through the Electronic Funds Transfer processing and switching system and the software communication gateway;
in response to sending the payment authorization to the user's source of funds, receiving a payment confirmation from the user's source of funds through the Electronic Funds Transfer processing and switching system and the software communication gateway;
sending the payment confirmation to the mobile software application;
sending the payment confirmation to the point of sale terminal through the Electronic Funds Transfer processing and switching system and the software communication gateway; and
receiving an acknowledgement receipt of the payment confirmation from the point of sale terminal through the Electronic Funds Transfer processing and switching system and the software communication gateway.

12. The system of claim 11, wherein the point of sale terminal identification number is obtained from a matrix code associated with the point of sale terminal.

13. The system of claim 11, wherein the received point of sale terminal identification number is manually entered by the user via the mobile software application.

14. The system of claim 11,
wherein the received payment authorization from the mobile software application comprises a final purchase amount and a tip; and
wherein the final purchase amount and the tip are confirmed by the user via the mobile software application.

15. The system of claim 11, wherein the point of sale terminal is configured to print physical transaction receipts.

16. The system of claim 11, wherein the point of sale terminal is further configured to send a transaction receipt through email to the user through the application service.

17. The system of claim 14, wherein the instructions that, when executed by the computer processor, further cause the computer processor to execute the steps of:
adding one or more additional charges to the final purchase amount before the confirmation, wherein the payment authorization request sent to the user's source of funds further comprises the one or more additional charges.

18. The system of claim 11, the instructions that, when executed by the computer processor, further cause the computer processor to execute the steps of:

sending the acknowledgement receipt of the payment confirmation from the point of sale terminal payment complete notification to a merchant management system.

19. The system of claim 11, wherein the point of sale terminal is integrated to a self-checkout system.

\* \* \* \* \*